No. 673,280. Patented Apr. 30, 1901.
T. W. MORAN.
PRESSURE BALANCE SWIVEL JOINT.
(Application filed Dec. 20, 1900.)
(No Model.)
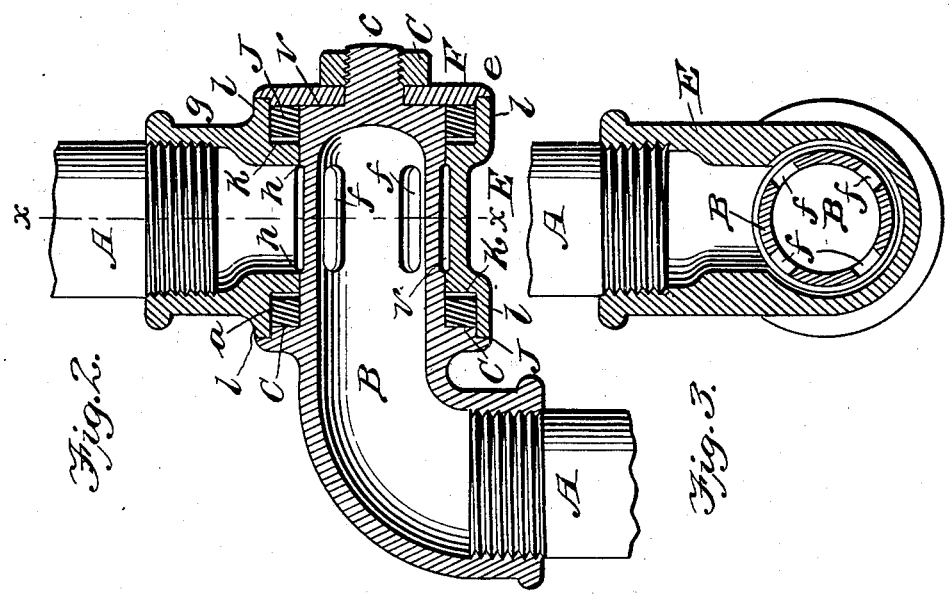
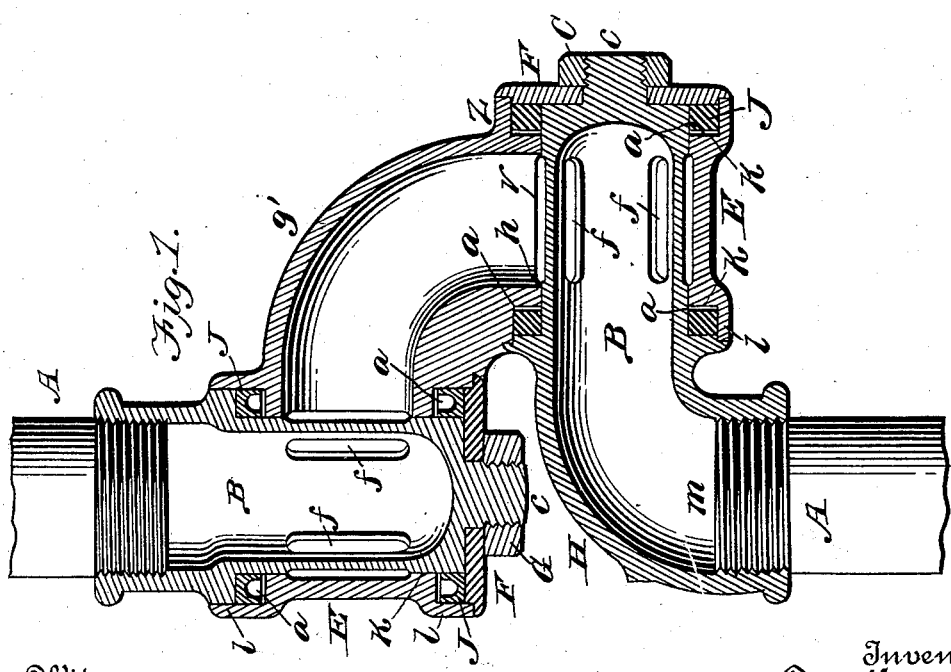
Witnesses
Edwin G. McKee
George M. Anderson
Inventor
T. W. Moran,
by E. W. Anderson
his Attorney

UNITED STATES PATENT OFFICE.

THOMAS W. MORAN, OF LOUISVILLE, KENTUCKY, ASSIGNOR TO MORAN FLEXIBLE STEAM JOINT COMPANY, OF SAME PLACE.

PRESSURE-BALANCE SWIVEL-JOINT.

SPECIFICATION forming part of Letters Patent No. 673,280, dated April 30, 1901.

Application filed December 20, 1900. Serial No. 40,598. (No model.)

*To all whom it may concern:*

Be it known that I, THOMAS W. MORAN, a citizen of the United States, residing at Louisville, in the county of Jefferson and State of Kentucky, have made a certain new and useful Invention in Pressure-Balanced Swivel-Joints; and I declare the following to be a full, clear, and exact description of the same, such as will enable others skilled in the art to which it appertains to make and use the invention, reference being had to the accompanying drawings, and to letters of reference marked thereon, which form a part of this specification.

The invention has relation to swivel-joints, and especially those in which the steam-pressure is automatically balanced; and it consists in the novel construction and combinations of parts, as hereinafter set forth.

In the accompanying drawing, A designates a portion of piping, which is threaded to receive the threaded end of a pivotal section B, which is shouldered at C to form an annular bearing face or wall of a gasket-chamber *a*. This pivotal section extends through the socket-section E and terminates in a shouldered end *b*, which is provided with a threaded stud *c*, which receives the central opening or bearing of the end cap F, which is peripherally shouldered or rabbeted to enter the end of the socket-section, as indicated at *e*. The outer or circumferential portion of the end cap or cap-plate F also forms a wall of an annular gasket-chamber. G represents a jam-nut on said threaded stud. The interior of the pivotal section is hollow and is provided with slots or openings *f* between its end bearing portions to communicate with the annular chamber *v* of the socket-section E, which is located between the gasket-chambers. This socket-section is formed, if single, with a pipe connection or thimble *g*, or, if double, with a quadrant neck *g'*, connecting two sockets at right angles to each other. In either case, however, the socket is formed with an annular chamber *v*, having at its ends interior bearings *h h*, which receive the cylindrical end bearing portions of the pivotal section. At the ends of these bearings *h h* are annular shoulders *k k*, which also form walls of said gasket-chambers, said shoulders facing opposite to the shoulder C of the pivotal section and to the circumferential portion of the face-plate hereinbefore referred to. Beyond these shoulders *k k* extend the cylindriform flanges *l l*, which close in the gasket-chambers peripherally. These chambers are thus formed partly by walls of the socket-section and partly by walls of the pivotal section. In these gasket-chambers are placed the gaskets J J, which may be either square or cup form in cross-section. The gaskets and wall-bearings of their chambers are designed to be of similar size and conformation at each end of the socket-section, so that the pressure will be equal in both directions, and as the gaskets are not designed to be pressed between the metallic surfaces they are not made to fit tight in the chambers. This pressure of the steam, air, or water passing by the communication between the cylindrical bearing portions of the pivotal and socket sections takes against the adjacent face of each gasket and holds it pressed against the outer wall—that is to say, against the wall C, which is formed by the shoulder of the pivotal section—and against the outer portion of the cap-plate, which also forms a gasket-chamber wall, as hereinbefore explained. By this pressure the gaskets are automatically connected to the pivotal section, and as one annular face wall is in close contact with the chamber-walls of the pivotal section and the other annular face is held loose or comparatively free by the steam, air, or water pressure the only portion of the gaskets which are exposed to wearing contact are their outer cylindriform or peripheral faces, which turn against the inner walls of the extension-flanges of the socket portions. The pressure of the steam, air, or water, as the case may be, being equalized at the ends of the socket-section no undue wear of the gaskets will be caused by such pressure, and when there is any weight on the joint, as when a double joint is used to form a universal-joint coupling for steam-pipes on railway-cars, the weight of the parts will be cushioned by the steam to a very important extent, thus relieving the parts from undue wear.

When the double joint is used, the quadrant-bend connection of the sockets is supplemented by a curved neck (indicated at H) on one of the pivotal sections, which is of proper size to bring the axial line of its threaded end $m$ and its connected pipe-section in line with the axis of the other pivotal section and its connected pipe-section. In this manner the horizontal rotation of the movable pipe portion is axially centered on the vertical pivotal section in a permanent manner, rendering the joint very compact and easy of operation.

Having described this invention, what I claim, and desire to secure by Letters Patent, is—

1. In a pipe-joint, the combination with the socket-section provided with annular bearing-surfaces at each side thereof, and having gasket-chambers outside of said bearing-surfaces, of the slotted section fitting within said socket-section, and resting upon said bearing-surfaces, said slotted section fitting within and having an annular bearing against the peripheral wall of one of said gasket-chambers, and having a stem, the end plate fitting over said stem, and within, and having an annular bearing against the peripheral wall of the other of said gasket-chambers, means for securing said end plate in place upon said stem, and the gaskets in said chambers, substantially as specified.

2. In a pipe swivel-joint, the combination with the quadrant bend, having the socket portions at right angles to each other, of the pivotal portions, having respectively a straight neck and a curved neck, whereby the connected pipe-sections are brought in axial line with each other, substantially as specified.

In testimony whereof I affix my signature in presence of two witnesses.

THOS. W. MORAN.

Witnesses:
 HERBERT C. EMERY,
 GEORGE M. ANDERSON.